(12) United States Patent
Lee (10) Patent No.: US 10,905,951 B2
(45) Date of Patent: Feb. 2, 2021

(54) APPARATUS AND METHOD FOR OPERATING MOBILE GAME

(71) Applicant: NHN Entertainment Corp., Seongnam-si (KR)

(72) Inventor: Dongjin Lee, Seongnam-si (KR)

(73) Assignee: NHN ENTERTAINMENT CORP., Seongnam-si (KR)

(*) Notice: Subject to any disclaimer, the term of this patent is extended or adjusted under 35 U.S.C. 154(b) by 70 days.

(21) Appl. No.: 16/180,837

(22) Filed: Nov. 5, 2018

(65) Prior Publication Data

US 2019/0134499 A1 May 9, 2019

(30) Foreign Application Priority Data

Nov. 7, 2017 (KR) .................. 10-2017-0147118

(51) Int. Cl.
| | |
|---|---|
| *A63F 13/26* | (2014.01) |
| *A63F 13/35* | (2014.01) |
| *A63F 13/23* | (2014.01) |
| *H04L 29/06* | (2006.01) |
| *A63F 13/77* | (2014.01) |
| *A63F 13/533* | (2014.01) |
| *A63F 13/355* | (2014.01) |
| *A63F 13/352* | (2014.01) |

(52) U.S. Cl.
CPC ............. *A63F 13/26* (2014.09); *A63F 13/23* (2014.09); *A63F 13/35* (2014.09); *A63F 13/352* (2014.09); *A63F 13/355* (2014.09); *A63F 13/533* (2014.09); *A63F 13/77* (2014.09); *H04L 67/38* (2013.01); *A63F 2300/301* (2013.01); *A63F 2300/308* (2013.01); *A63F 2300/403* (2013.01)

(58) Field of Classification Search
CPC .......... A63F 13/26; A63F 13/23; A63F 13/35; A63F 13/352; A63F 13/355; A63F 13/533; A63F 13/77; A63F 2300/301; A63F 2300/308; A63F 2300/403; H04L 67/38

See application file for complete search history.

(56) References Cited

U.S. PATENT DOCUMENTS

2014/0181675 A1   6/2014 Suziki et al.

FOREIGN PATENT DOCUMENTS

| JP | 2013054680 A | 3/2013 |
|---|---|---|
| JP | 5748343 B2 | 5/2015 |

(Continued)

OTHER PUBLICATIONS

Japanese Office Action dated Sep. 17, 2019, in connection with the Japanese Patent Application No. 2018-207038 citing the above reference(s).

(Continued)

*Primary Examiner* — Corbett B Coburn
(74) *Attorney, Agent, or Firm* — Hauptman Ham, LLP (57) ABSTRACT

A mobile game driving method includes executing an emulator for causing a mobile game to be compatible in a personal computer, creating, by the emulator, a virtual terminal, executing the mobile game through the virtual terminal, displaying an interface screen of the mobile game in a basic mode, executing a multi-display function to simultaneously display at least two of a plurality of interface screens including the interface screen of the mobile game, and changing the basic mode to a multi-mode according to execution of the multi-display function and displaying at least two interface screens in different regions in the multi-mode.

20 Claims, 8 Drawing Sheets

(56) References Cited

FOREIGN PATENT DOCUMENTS

| KR | 10-2004-0102679 A | 12/2004 |
|----|-------------------|---------|
| KR | 10-2011-0052457 A | 5/2011 |
| KR | 10-2012-0099776 A | 9/2012 |
| KR | 10-2013-0081118 A | 7/2013 |

OTHER PUBLICATIONS

Korean Notice of Allowance dated Sep. 2, 2019, in connection with the Korean Patent Application No. 10-2017-0147118 citing the above reference(s).

APPARATUS AND METHOD FOR OPERATING MOBILE GAME

CROSS-REFERENCE TO RELATED APPLICATIONS

The present application is based on, and claims, priority from KR Application Serial Number 10-2017-0147118, filed on Nov. 5, 2017. The disclosure of the above-listed application is hereby incorporated by reference herein in their entirety.

FIELD

The present disclosure relates to an apparatus and method for operating a mobile game and, more particularly, to a method and apparatus for operating a mobile game, which is operated in a terminal, in a personal computer.

BACKGROUND

The statements in this section merely provide background information related to the present disclosure and do not constitute prior art.

In general, smart devices such as smartphones, tablet PCs, personal digital assistants (PDAs), and the like, may install and execute an application program (hereinafter, referred to as an 'application') having a specific purpose and function in a device.

A computer game is a game played by a player, while interacting with a computing device, to cause a processor to perform certain computations and instructions, and typically display results of the certain computations on a screen or a display device to thus provide fun to the player.

Meanwhile, due to the recent development of mobile environments, mobile games executed in smart devices, among computer games, have come to prominence and the market of the mobile games shows an obvious growth trend.

However, the inventor(s) has noted that as the mobile game technologies have rapidly been developed, mobile games of high performance have been released, causing users of outdated smart devices to have difficulty in operating the latest mobile games.

In addition, the inventor(s) has noted that some of the recently released mobile games may need to be performed only in important situations with a certain term or a plurality of mobile games may need to be performed at the same time. The inventor(s) has noted that In this case, a user who is working with a personal computer has to constantly check a smart device, while working, which leads to a decrease in efficiency of work.

To this end, emulators capable of executing a mobile game in a personal computer have been developed and serviced.

Such emulators provide a function of creating a virtual smart device in a personal computer using some resources of the personal computer and executing a mobile game in the virtual smart device in the same manner as that in an environment executed in an existing smart device.

However, the inventor(s) has noted that the currently developed emulators display the completely same screen as that of a mobile game screen executed in the existing smart device on the personal computer, and thus, a large display screen, various operation devices (e.g., a keyboard, a mouse, etc.), and resource of high performance of the personal computer cannot be sufficiently utilized. The inventor(s) has noted that KR patent publication No. 10-2004-0102679 A is a related art document which describes a known emulator to provide a function of creating a virtual smart device in a personal computer.

SUMMARY

According to some embodiments of the present disclosure, a mobile game operating method performed in a processor for executing a mobile game in a personal computer includes: executing an emulator for causing a mobile game to be compatible in a personal computer; creating, by the emulator, a virtual terminal; executing the mobile game through the virtual terminal; displaying an interface screen of the mobile game in a basic mode; executing a multi-display function to simultaneously display at least two of a plurality of interface screens including the interface screen of the mobile game; and changing the basic mode to a multi-mode according to execution of the multi-display function and displaying at least two interface screens in different regions in the multi-mode.

According to some embodiments of the present disclosure, a mobile game operating apparatus as a personal computer connected to a display device includes: a memory, including one or more non-transitory recording medium, storing an emulator program executing a mobile game in a compatible manner and a mobile game application; and a processor, including one or more integrated circuits, executing the emulator program in the memory and subsequently creating a virtual terminal through the emulator program, and executing the mobile game through the virtual terminal. Herein when the mobile game is executed, the processor controls the display device to display an interface screen of the mobile game in a basic mode, and when a multi-display function is executed according to a user input, the processor controls the display device to simultaneously display at least two of a plurality of interface screens including the interface screen of the mobile game.

DETAILED DESCRIPTION

Various embodiments of the present disclosure relate to providing a mobile game operating method and apparatus capable of providing a multi-display function to simultaneously display a plurality of interface screens related to a mobile game during a process of playing the mobile game in providing an emulating service for executing the mobile game in a personal computer.

The present disclosure may be modified variably and may have various embodiments, particular examples of which will be illustrated in drawings and described in detail. The advantages and features of the present disclosure and methods for achieving these will be clarified in detail through embodiments described hereinafter in conjunction with the accompanying drawings. However, embodiments of the present disclosure may, however, be implemented in many different forms and should not be construed as being limited to the embodiments set forth herein. It will be understood that although the terms "first," "second," and the like may be used herein to describe various components, these components should not be limited by these terms. These components are only used to distinguish one component from another. Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added. In the drawings, the sizes or shapes of elements may be exaggeratedly illustrated for clarity and convenience of description.

Hereinafter, embodiments of the present disclosure will be described in detail with reference to the accompanying drawings. In adding reference numerals for elements in each figure, it should be noted that like reference numerals already used to denote like elements in other figures are used for elements wherever possible.

Mobile Game Operating System

Figure 1:
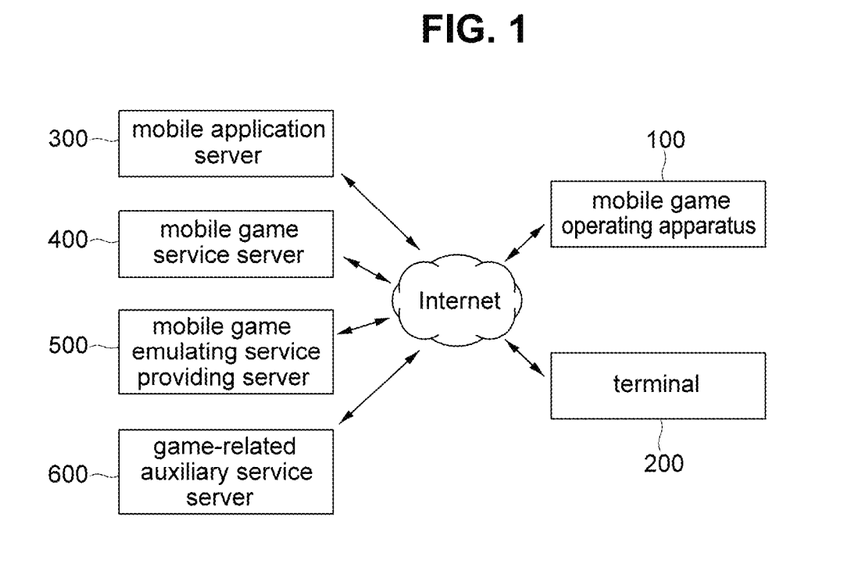
FIG. 1 is a schematic block diagram of a mobile game operating system according to an embodiment of the present disclosure.

FIG. 1 is a block diagram of a mobile game operating system according to an embodiment of the present disclosure.

Referring to FIG. 1, a mobile game operating system according to an embodiment may include a mobile game service server 400, a mobile application providing server 300, a game-related auxiliary service server 600, a mobile game emulating service providing server 500, a terminal 200, and a mobile game operating apparatus 100.

Mobile Application Providing Server 300

The mobile application providing server 300 may be, when an application provider registers an application, a server that transmits the registered application at the request of the terminal 200 and the mobile game operating apparatus 100. Specifically, the mobile application providing server 300 may be at least one of an operating system of the mobile application providing server terminal 200, a manufacturer, and an application store operated by a mobile carrier.

Here, the application may be any application program installed in the terminal 200 and performing an additional function, for example, a mobile game application, a web browser application, a messenger application, or the like.

Hereinafter, for the purposes of description, a mobile application is limited to a mobile game, but the description of the mobile game may be applied to any other general applications that may be easily conceived by a person skilled in the art.

Mobile Game Service Server 400

The mobile game service server 400, which serves to transmit and receive data required for executing the mobile game to and from the terminal 200 and the mobile game operating apparatus 100, may be operated by a mobile game provider.

The mobile game service server 400 may provide a mobile game service such that the mobile game is suitable for execution in the terminal 200.

Game-Related Auxiliary Service Server 600

The game-related auxiliary service server 600 may be a server that provides auxiliary services required in relation to the mobile game.

Specifically, the game-related auxiliary service server 600 may provide an auxiliary service required for allowing a user who enjoys a mobile game to enjoy the mobile game more easily and amusingly.

For example, the game-related auxiliary service server 600 may be a game information website server that starts information regarding attack of a mobile game, items, monsters, characters, and the like, and may be an item relay site server for real transaction of mobile game items.

Mobile Game Emulating Service Providing Server 500

The mobile game emulating service providing server 500 may be a server that provides an emulator so that the mobile game may be executed in the mobile game operating apparatus 100 which is a personal computer (PC).

In detail, the mobile game emulating service providing server 500 may transmit an emulator, which is a program compatible with the mobile game to be executed in a personal computer, and may transmit and receive necessary data to and from the personal computer after the emulator is executed.

Also, the mobile game emulating service providing server 500 may transmit and receive data necessary for executing the multi-display function after executing the emulator in the personal computer.

Terminal 200

The terminal 200 may be a device that executes a mobile game.

Since the mobile game is produced for the terminal 200, the terminal 200 may download the mobile game from the application providing server 300 and then execute the mobile game, without executing a separate emulator.

Such a terminal 200 may be a smartphone, a mobile phone, a digital broadcasting terminal 200, a personal digital assistant (PDA), a portable multimedia player (PMP), a navigation device, a tablet PC, a wearable devices, a glass-type terminal (smart glass), or the like. The terminal 200 is implemented by, or includes, one or more processors and/or application-specific integrated circuits (ASICs).

Outline of Mobile Game Operating Apparatus

The mobile game operating apparatus 100 may be an apparatus for installing a separate emulator and executing a mobile game through the emulator.

Specifically, the mobile game operating apparatus 100, which is a personal computer such as a desktop PC, a laptop computer, or an ultrabook, differs in specification, operating system, and the like, from a mobile game, and thus, although a mobile game is downloaded from an application providing server, the mobile game operating apparatus 100 cannot execute the mobile game by itself.

Thus, the mobile game operating apparatus 100 may download an emulator, an auxiliary program that enables a mobile game to be executed in a personal computer, from the emulating service providing server 500 (or from a separate server), execute the emulator, and execute the mobile game through the executed emulator.

Specifically, the mobile game operating apparatus 100 may download an emulator from the emulating service providing server 500, install the emulator, and then execute the emulator to create a virtual terminal in the mobile game operating apparatus 100. Thereafter, the mobile game operating apparatus 100 may be connected to the application providing server 300 through the created virtual terminal to download and install a mobile game application, executes the mobile game with the virtual terminal to execute the mobile game, while exchanging data with the mobile game service server 400.

Constitution of Mobile Game Operating Apparatus

Figure 2:
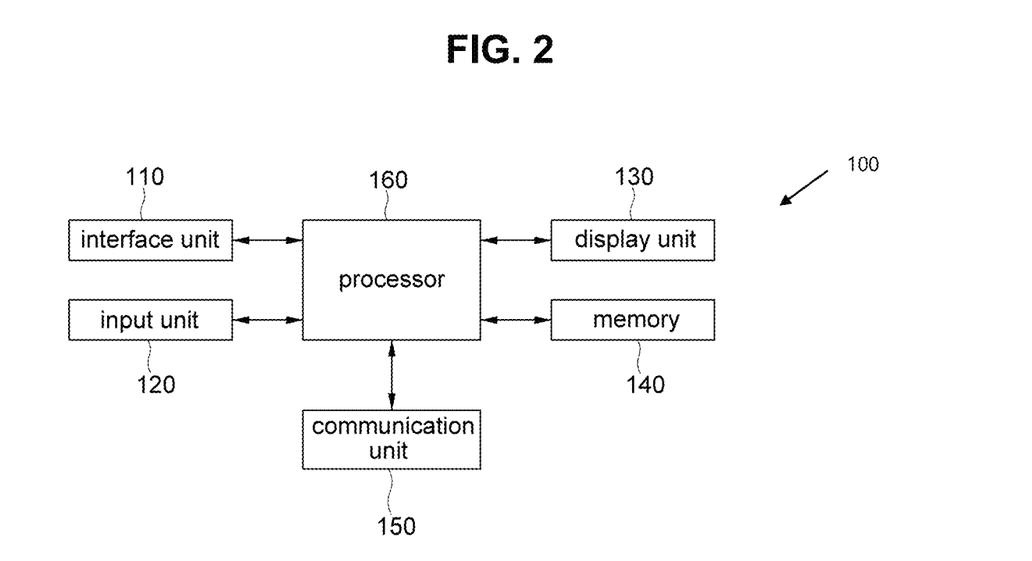
FIG. 2 is a schematic block diagram of a mobile game operating apparatus according to an embodiment of the present disclosure.

The mobile game operating apparatus 100 may include an interface unit 110, an input unit 120, a display unit 130, a memory 140, a communication unit 150, and a processor 160. However, the components illustrated in FIG. 2 are not essential for realizing the mobile game operating apparatus 100 and the mobile game operating apparatus 100 described in this disclosure may have greater or fewer components than those listed above. The mobile game operating apparatus 100 is implemented by, or includes, one or more processors and/or application-specific integrated circuits (ASICs). Other components of the mobile game operating apparatus 100, such as each of the interface unit 110, the input unit 120, the display unit 130 and the communication unit 150 are implemented by, or includes, one or more processors and/or application-specific integrated circuits (ASICs) to execute operations or functions specified to each corresponding unit. The memory 140 includes one or more non-transitory computer readable recording medium, i.e., a hardware device that is specially configured to store and execute program instructions (for example, the memory includes magnetic recording media, such as a hard disk, a floppy disk, and a magnetic tape, and optical recording media, such as a compact disk read only memory (CD-ROM) and a digital video disk (DVD), magneto-optical media, such as a floptical disk, and, such as a ROM, a random access memory (RAM), and a flash memory). The processor 160 is a hardware device including electrical circuits or integerated circuits (for example, a single interated circuit or multiple interated circuits) to compute executes program(s) and/or instruction(s). The communication unit 150 includes communication modem(s) to receive and/or communication signals to thereby communicate with other terminals and/or network devices or entities through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks). In this regard, the term, unit indicates a hardware including electrical circuit(s) and the "unit" can be replaced for a "circuit" with respect to the interface unit 110, an input unit 120, a display unit 130, a memory 140, a communication unit 150.

Specifically, the interface unit 110 may serve as a data channel with various types of external devices connected to the mobile game operating apparatus 100. For example, the interface unit 110 may be connected to input devices (e.g., a mouse, a keyboard, and the like) to receive a user's input.

In addition, the interface unit 110 may be connected to a display device (e.g., a monitor) to transmit graphic images.

The interface unit 110 may include at least one of a wired/wireless headset port, an external charger port, a wired/wireless data port, a memory card port, a port connecting a device having an identification module, an audio input/output (I/O) port, a video I/O port, and an earphone port. In addition, the interface unit 110 may include a short-range wireless communication module such as Bluetooth or Wi-Fi.

The input unit 120 may sense a user's input.

Specifically, the input unit 120 may sense an execution input for turning on/off the mobile game operating apparatus 100, a setting for various emulators and an execution input, a setting for a mobile game and an execution input, and the like.

For example, the input unit 120 may include various buttons disposed in the mobile game operating apparatus 100. The input unit 120 may include a touch sensor coupled with the display unit 130 or a display device. Also, the input unit 120 may include input devices such as a mouse, a keyboard, or the like, connected through the interface unit 110.

The display unit 130 may display a graphic image.

Specifically, the display unit 130 may display an emulator-related graphic image, a mobile game-related graphic image, and the like.

The display unit 130 may be a display mounted on a personal computer or a display device connected through the interface unit 110.

The display unit 130 may be a liquid crystal display (LCD), a thin film transistor-liquid crystal display (TFT LCD), an organic light-emitting diode (OLED), a flexible display, a 3D display, and an e-ink display.

The memory 140 may store a plurality of application programs operated in the mobile game operating apparatus 100 and data and instructions for an operation of the mobile game operating apparatus 100.

Specifically, the memory 140 may store an emulator-related program for operating a mobile game and may store a mobile game application executable through an emulator.

The memory 140 may be various storage devices such as a ROM, a RAM, an EPROM, a flash drive, a hard drive, and the like, and may be a web storage performing a storage function of the memory 140.

The communication unit 150 may wiredly/wirelessly communicate with at least one of the mobile application providing server 300, the mobile game service server 400, the game-related auxiliary service providing server, and the mobile game emulating service providing server.

Specifically, the communication unit 150 may download a mobile game application from the mobile application providing server 300, transmit and receive various data for executing a mobile game to and from the mobile game service server 400, transmit and receive data necessary for providing an auxiliary service to and from the game-related auxiliary service providing server, receive an emulator from the mobile game emulating providing server, and transmit/receive various data necessary for executing the emulator.

The processor 160 may controls a general operation of each unit to execute a mobile game with the emulator.

Specifically, the processor 160 may execute the emulator, create a virtual terminal through the emulator, and then execute a mobile game through the created virtual terminal.

Such a processor 160 may be realized using at least one of an application specific integrated circuit (ASIC), a digital signal processor (DSP), a digital signal processing device (DSPD), a programmable logic device (PLD), a field programmable gate array (FPGA), a controller, a micro-controller, a micro-processor, and an electric unit for performing other functions.

That is, the emulator program may be provided through a network, installed in the memory 140 of the mobile game operating apparatus 100, and read out by the processor 160 through the RAM.

The emulator program read by the processor 160 allows the processor 160 to control each unit of the mobile game operating apparatus 100 to perform the mobile game service method as described below.

Hereinafter, the process of providing a mobile game service by controlling various units of the mobile game operating apparatus 100 by the processor 160 will be described in detail with reference to FIGS. 3 to 13.

Figure 3:
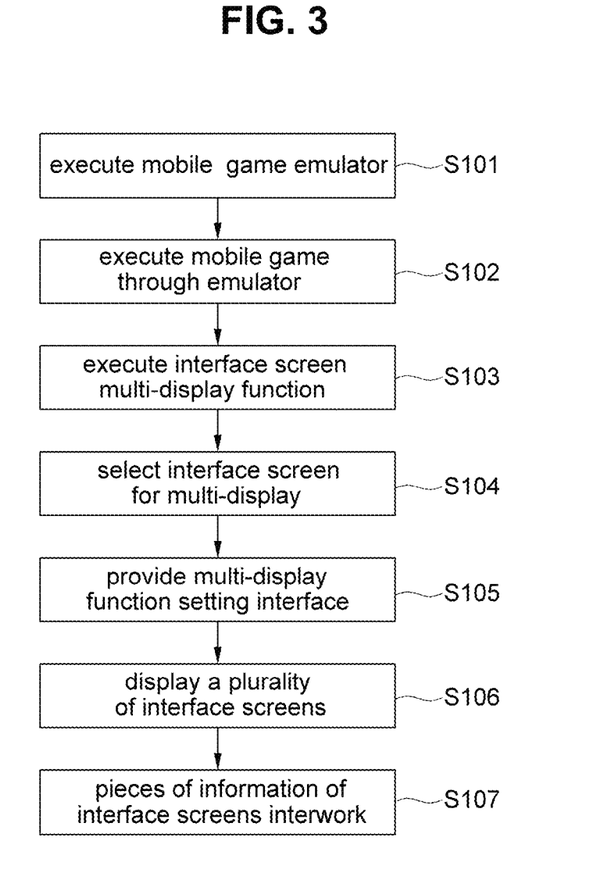
FIG. 3 is a flowchart illustrating a mobile game operating method according to an embodiment of the present disclosure.

Referring to FIG. 3, the processor 160 of the mobile game operating apparatus 100 may execute an emulator (S101).

Specifically, the processor 160 may execute the emulator that allows a mobile game to be compatible with a personal computer in accordance with an execution input of a user.

When the emulator is executed, the processor 160 may create a virtual terminal through the emulator, and the display unit 130 may display an execution screen of the virtual terminal. Specifically, an emulator execution window including the screen on which the virtual terminal is executed may be displayed in at least a partial region of the display unit 130.

Specifically, the emulator execution window may include at least one of a virtual terminal screen, a setting region of the emulator, and the like. The emulator setting function may include a virtual terminal screen size, position adjustment, engine performance setting (e.g., RAM capacity, resolution, partition, etc.), setting of an input signal (e.g., mouse input, keyboard input) of the input unit 120 and a touch input of the terminal 200 (key mapping function), a multi-display function, and a multi-display setting function.

Next, the processor 160 may execute a mobile game through the emulator (S102).

Specifically, the user may download the mobile game from the application providing server 300 in the emulator execution window and install the mobile game in the virtual terminal.

Thereafter, when the user executes the mobile game on the virtual terminal screen, the processor 160 may execute the mobile game through the emulator to operate the mobile game on the virtual terminal screen.

Thus, the user may enjoy the mobile game in an environment similar to that of the terminal 200 by performing a user input through the input unit 120, while viewing the mobile game screen provided on the virtual terminal screen.

Figure 4:
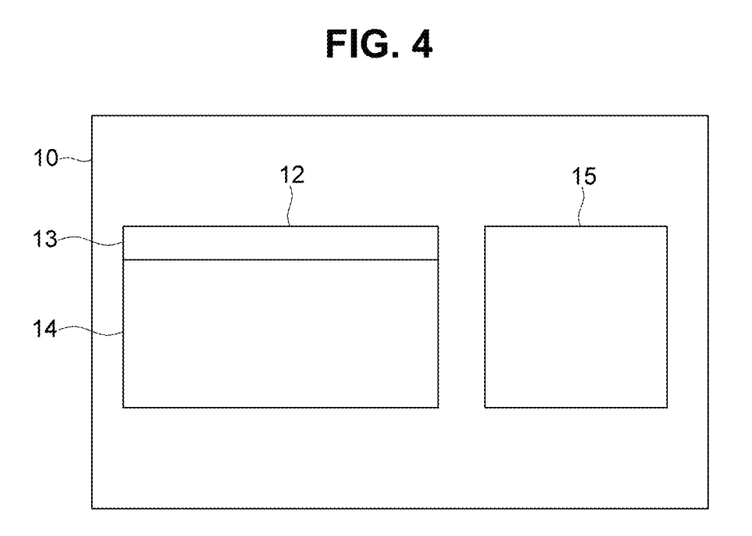
FIG. 4 is a screen of a display unit when an emulator for operating a mobile game is executed according to an embodiment of the present disclosure.

FIG. 4 illustrates a screen of the display unit 130 when the emulator for operating a mobile game is executed according to an embodiment of the present disclosure.

For example, referring to FIG. 4, when the emulator is executed, an operating system screen of the mobile game operating apparatus 100 may be displayed on the entire display unit 130, and an emulator execution window 12 may be displayed in at least a partial region of the operating system screen 10 and an auxiliary service execution window 15 such as a web browser window may be additionally displayed. The emulator execution window 12 may include a virtual terminal screen 14 and an emulator setting region 13.

Accordingly, when the mobile game is executed, an interface screen of the mobile game may be displayed on the virtual terminal screen 14 and the user may enjoy the mobile game on the virtual terminal screen 14 through the interface screen.

Here, the screen of the display unit 130 larger than the terminal 200 may be efficiently utilized through the multi-display function provided to the emulator.

Here, the multi-display function may be a function of dividing a region of the virtual terminal screen 14 into a plurality of regions and displaying interface screens of different roles in the plurality of divided regions.

In another embodiment, the multi-display function may be a function of creating and displaying a separate virtual terminal screen in addition to the basic virtual terminal screen 14 and displaying different interface screens on the respective virtual terminal screens.

When a mobile game is executed in the terminal 200, only one interface screen may be displayed, or in order to display an additional interface screen, it may be inevitably displayed on another interface screen in an overlapping manner. In this case, the user cannot properly view the plurality of interface screens and control only one interface screen.

However, since the multi-display function allows a plurality of interface screens to be displayed in different regions using the screen of the display unit 130 larger than the terminal 200, the user may execute various functions related to the mobile game, while viewing a plurality of interface screens simultaneously on the single virtual terminal screen 14, to enjoy the mobile game more smoothly and easily.

An interface screen will be described in detail first with reference to FIGS. 5 to 8.

In an embodiment, an interface screen may include a plurality of interface screens in a mobile game and may further include at least one of an emulator setting interface screen and an interface screen of a mobile game-related auxiliary service.

Interface Screen of Mobile Game

The plurality of interface screens in the mobile game may include a first interface screen as a main screen of the mobile game, a second interface screen as a sub-screen of the mobile game, and a third interface screen as a partial region of the main screen.

First Interface Screen

Specifically, when the mobile game is executed in the virtual terminal (or the terminal 200), the main screen may be displayed on the entire screen, and here, the main screen is defined as the first interface screen. For example, the first interface screen may be a game start interface screen, a playing screen or an ending screen during game execution, and the like.

The first interface screen may be a screen displayed on the entire region of the terminal 200 when the mobile game is executed in the terminal 200, or may be a screen displayed on the entire screen of the display unit 130 in a basic mode before execution of the multi-display function.

Second Interface Screen

The second interface screen may be a sub-screen of the mobile game and may be an auxiliary interface screen of the mobile game. Specifically, the second interface screen may be a sub-screen displayed in a partial region of the first interface screen or a sub-screen displayed as the first interface screen is changed.

In another aspect, the second interface screen may be defined as an interface screen executed when an icon is selected from the first interface screen.

For example, the second interface screen may be at least one of an inventory screen, a game setting window, a payment window, and an item store window.

Figure 5:
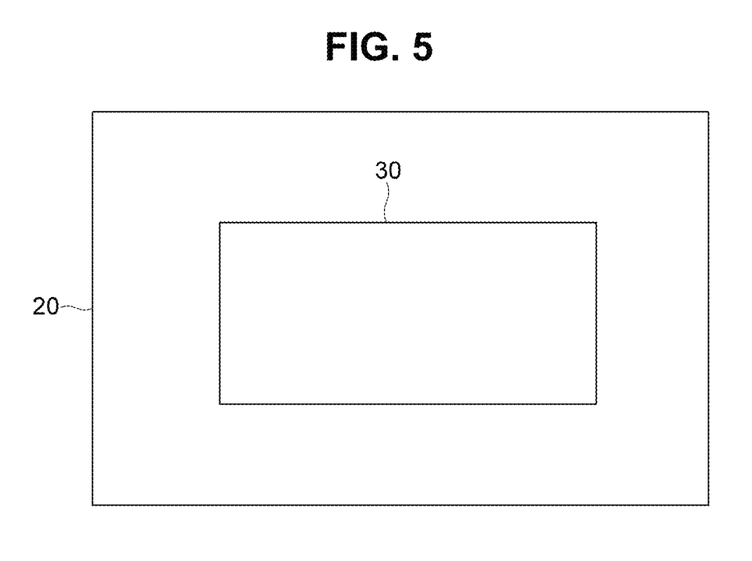
FIG. 5 is a conceptual diagram for defining a first interface screen and a second interface screen according to an embodiment of the present disclosure.

FIG. 5 is a conceptual diagram for defining the first interface screen and the second interface screen according to an embodiment of the present disclosure.

For example, referring to FIG. 5, in the basic mode, the first interface screen 20 is displayed in the entire region of the virtual terminal screen 14, and when a specific icon is selected from the first interface screen 20, the second interface screen 30 corresponding to the specific icon may be displayed on the first interface screen 20 in an overlapping manner.

In this manner, when the mobile game is executed in the general basic mode, only the main screen is displayed, and in order to perform the interface of the sub screen, the entirety or a portion of the main screen is covered and only one of the interface of the main screen and the interface of the sub-screen may be performed.

However, in the multi-mode in which the multi-display function is executed, the first interface screen 20 may be displayed in a region of the virtual terminal screen 14 and the second interface screen 30 may be executed in the other region so that the user may view and control the main screen and the sub-screen at the same time to more effectively play the mobile game than in the basic mode. Also, if display of the first interface screen 20 is unnecessary, only the second interface screen 30 may be displayed.

Third Interface Screen

Figure 6:
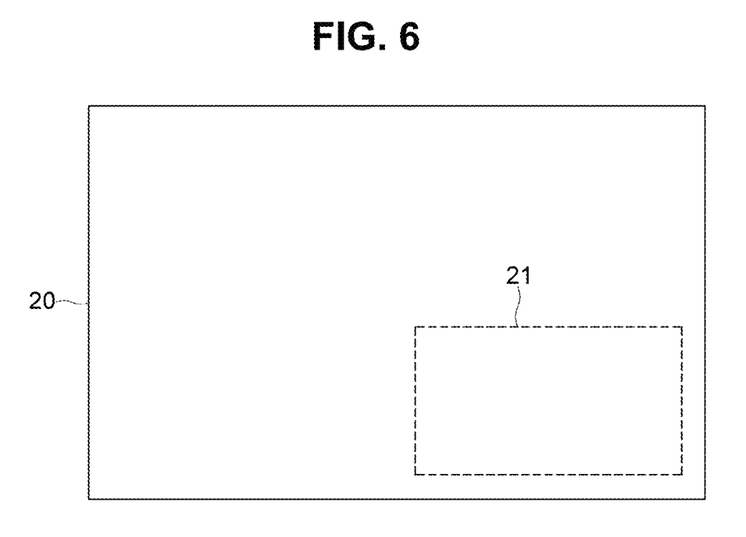
FIG. 6 is a conceptual diagram for defining a third interface screen according to an embodiment of the present disclosure.

FIG. 6 is a conceptual diagram for defining a third interface screen according to an embodiment of the present disclosure.

Referring to FIG. 6, the third interface screen 21 may be a partial region of the first interface screen 20.

Specifically, a character state display region, a progress state description region, an operation button display region, a map region, and a playing screen region may be displayed on the first interface screen 20, and at least one thereof may be the third interface screen 21.

In another aspect, the third interface screen 21 may be a partial region designated by a user input in the first interface screen 20.

As described above, in the multi-mode, the first interface screen 20 may be displayed in a region of the virtual terminal screen 14, and the third interface screen 21 may be displayed in another region thereof. The user may execute the multi-display function when he wants to view only a partial region of the first interface screen 20 in a magnified manner or when he wants to display only a partial region on the display unit 130 screen.

For example, the user may display only a game progress status window in a partial region of the display unit 130 during execution of other tasks, so that the user may smoothly perform other tasks, while quickly checking the occurrence of an urgent situation.

Fourth Interface Screen

Figure 7:
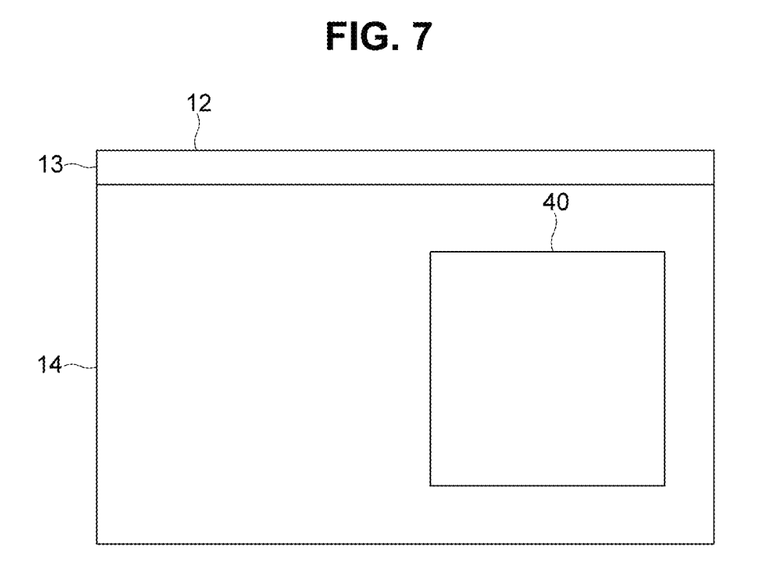
FIG. 7 is a conceptual diagram for defining a fourth interface screen according to an embodiment of the present disclosure.

FIG. 7 is a conceptual diagram for defining a fourth interface screen according to an embodiment of the present disclosure.

Referring to FIG. 7, the emulator execution window 12 may further include an interface region for setting an emulator, as well as the virtual terminal screen 14. When the emulator setting function is executed, an emulator setting window may be displayed inside or outside the emulator execution window 12.

The fourth interface screen 40 may include an engine performance setting (e.g., RAM capacity, resolution, partition, etc.) window or a window for matching an input signal (e.g., mouse input or keyboard input) of the input unit 120 and a touch input of the terminal 200, and the like.

Thus, in the multi-mode, the first interface screen 20 may be displayed in a region of the virtual terminal screen and the fourth interface screen 40 may be displayed in another region, and thus, when there is a problem in the setting the emulator while the user is playing the mobile game, the user may change the setting of the emulator in real time and check a change (e.g., change in resolution, key operation, etc.) of the first interface screen 20, while changing the setting of the emulator.

Fifth Interface Screen

Figure 8:
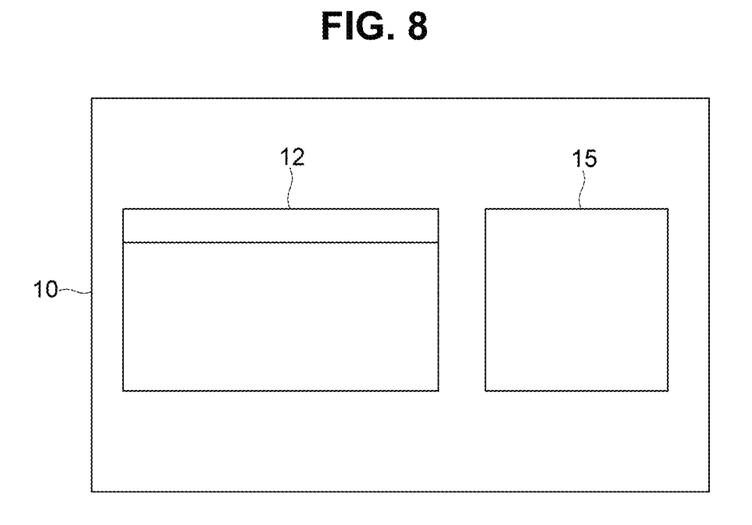
FIG. 8 is a conceptual diagram for defining a fifth interface screen according to an embodiment of the present disclosure.

FIG. 8 is a conceptual diagram for defining a fifth interface screen according to an embodiment of the present disclosure.

Referring to FIG. 8, the mobile game operating apparatus 100 may further display an auxiliary service execution window 15 related to a mobile game, such as the emulator execution window 12.

The fifth interface screen 15 refers to a screen when the auxiliary service execution window 15 is displayed inside the virtual terminal screen 14 or in combination with the virtual terminal screen 14.

The fifth interface screen (15) may be a website window providing mobile game information such as an attack of a mobile game, a kid, a monster, a character description, and the like, and may be an item relay site window for transaction of a mobile game item.

When the multi-mode is executed, the fifth interface screen 15 together with the first interface screen 20 may be directly displayed on the virtual terminal screen 14 or displayed in combination with the virtual terminal screen 14, so that the user may check necessary information in real time or you sell/buy a mobile game-related item in real time, while playing the mobile game.

In addition, when the multi-mode is executed, the processor 160 may provide an auxiliary service interworking function to transmit information changed during performing of the mobile game to the game-related auxiliary service server 600 to provide an auxiliary service required for performing of the mobile game to the fifth interface screen 15.

For example, when a new monster or item appears on the first interface screen 20 during performing of the mobile game, the processor 160 may transmit changed information so that information regarding the monster or the item which appears on the fifth interface screen 15 may be displayed in real time.

Execution of Multi-Display Function

Referring back to the process of executing the multi-display function, the processor 160 may execute a multi-display function according to a user input. (S103).

For example, the user may directly execute the multi-display function in the emulator setting window or indirectly execute the multi-display function through a specific operation during execution of a mobile game or through an operation outside the emulator execution window 12.

In the multi-mode in which the multi-display function is executed, as described above, a plurality of interface screens may be displayed in different regions of the virtual terminal screen 14, respectively.

Selection of Interface Screen

To this end, first, the processor 160 may first provide an interface for selecting an interface screen for multi-display (S104).

Specifically, the user may execute the multi-display function and select at least one interface screen for multi-display.

Figure 9:
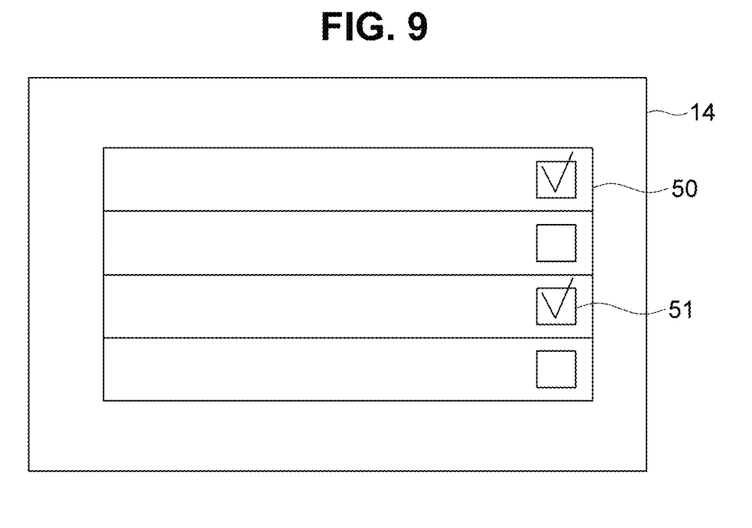
FIGS. 9 to 11 are examples of selecting an interface screen for multi-display according to an embodiment of the present disclosure.

For example, referring to FIG. 9, when the multi-display function is executed, the processor 160 may detect information regarding at least two displayable interface screens and display a list 50 of detected interface screens. The list 50 of the interface screens may include information regarding an interface screen, a selection icon 51, and the like. The user may select at least one interface screen for multi-display by checking the selection icon 51 for an interface screen to be displayed.

Figure 10:
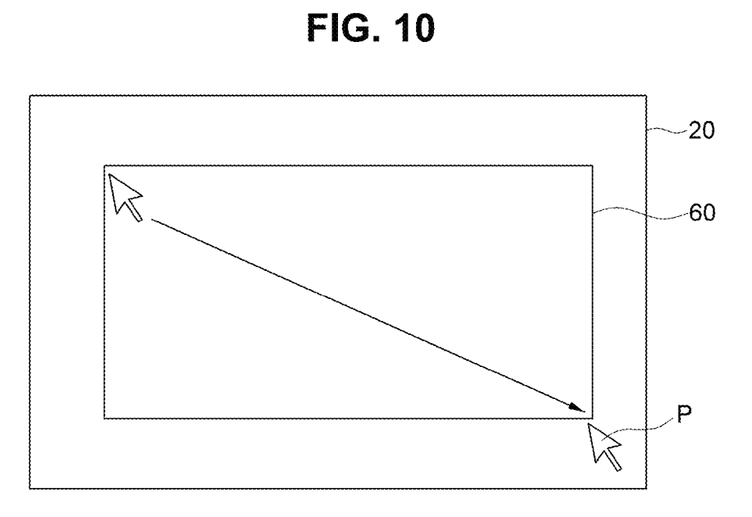

In another example, referring to FIG. 10, when the multi-display function is executed, the processor 160 causes the user to select a specific region 60 and designate a region 60 specified by a user input as an interface screen for multi-display. Thereafter, the processor 160 may display the designated interface screen together with the first interface screen 20 as a main screen, thus providing the multi-display function.

Figure 11:
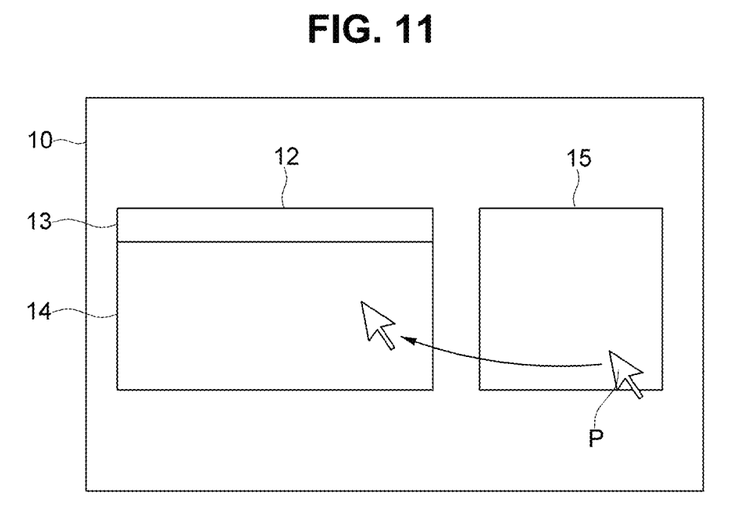

In another example, referring to FIG. 11, when a user input for moving the auxiliary service execution window 15 into the virtual terminal screen is received, the processor 160 may designate the auxiliary service execution window 15 as the fifth interface screen 15 and display the same in the virtual terminal screen.

Further, the processor 160 may link the mobile game performed in real time to the fifth interface screen 15 displayed in the virtual terminal screen.

Change in Multi-Display Screen

The processor 160 may provide an interface for changing a region in which an interface screen is displayed when the multi-display function is executed (S105).

In an embodiment, the processor 160 may divide the virtual terminal screen into at least two regions and display selected interface screens in the divided regions, respectively.

Here, the processor 160 may provide an interface for setting the number of divided regions and a size, disposition, position, movement, deletion, and the like, of the divided regions. The processor 160 may also provide a setting for selecting an interface screen to be displayed in the divided region.

Figure 12:
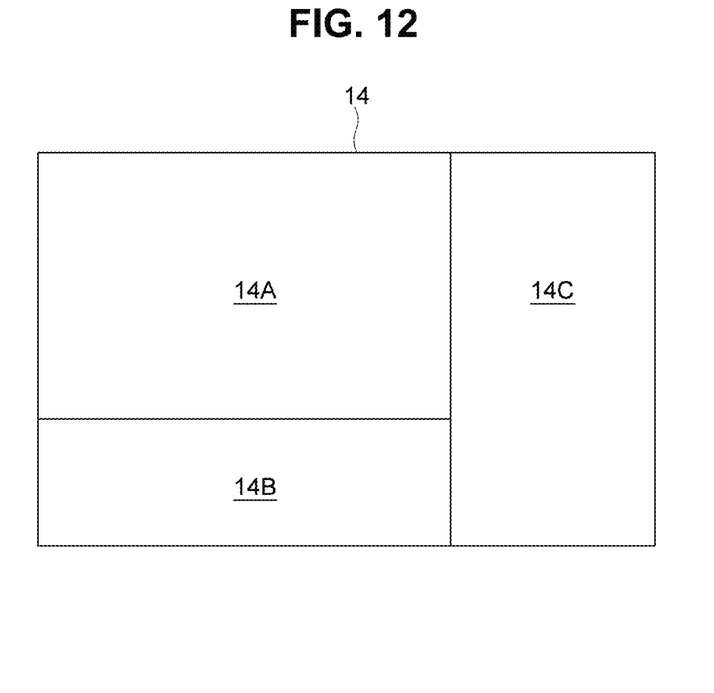
FIG. 12 is a virtual terminal screen when a multi-display function is executed according to an embodiment of the present disclosure.

FIG. 12 illustrates the virtual terminal screen 14 when the multi-display function is executed according to an embodiment of the present disclosure.

For example, referring to FIG. 12, the virtual terminal screen may include a first divided region 14A, a second divided region 14B disposed in a lateral direction of the first divided region 14A, and a third divided region 14C disposed under the first divided region 14A. The first divided region may display a game playing screen, the second divided region 14B may display a game inventory screen, and the third divided region 14C may display a game chatting window.

In another embodiment, when the multi-display function is executed, the processor 160 may newly create a virtual terminal screen in addition to the existing virtual terminal screen. This additional virtual terminal screen may be created not only inside the emulator execution window but also outside the emulator execution window.

That is, when the user wants to further display an interface screen, the user may create a new virtual terminal screen near the first virtual terminal screen on which the main screen is displayed, and display another interface screen on the newly created second virtual terminal screen.

Figure 13:
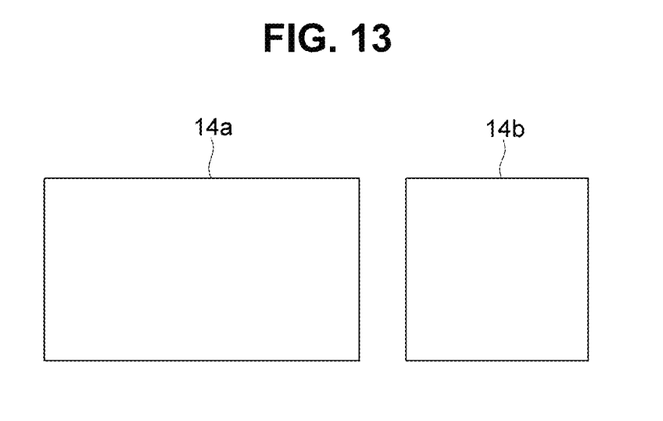
FIG. 13 is a plurality of virtual terminal screens when a multi-display function is executed according to another embodiment of the present disclosure.

FIG. 13 illustrates a plurality of virtual terminal screens 14 when a multi-display function is executed according to another embodiment of the present disclosure.

For example, referring to FIG. 13, the processor 160 may perform control to newly create and display a first virtual terminal screen 14a and a second virtual terminal screen 14a outside the first virtual terminal screen 14a according to a user input. Here, the first interface screen 20, a main screen, may be displayed on the first virtual terminal screen 14a, and the second interface screen 30, a sub-screen, may be displayed on the second virtual terminal screen 14b.

The plurality of virtual terminal screens 14a and 14b may be separately adjusted in size and position in the operating system screen 10 or may be combined with each other and adjusted in size and position together in the operating system screen 10.

After the interface screen selection and setting is completed, the processor 160 may control the display unit 130 to display a plurality of interface screens (S106).

Accordingly, the user may display a sub-screen required for a mobile game, an emulator setting screen, or the auxiliary service execution window 15 together with the main screen to his taste and perform control, while checking two screens at the same time.

Example of Execution of Multi-Display Function

Figure 14:
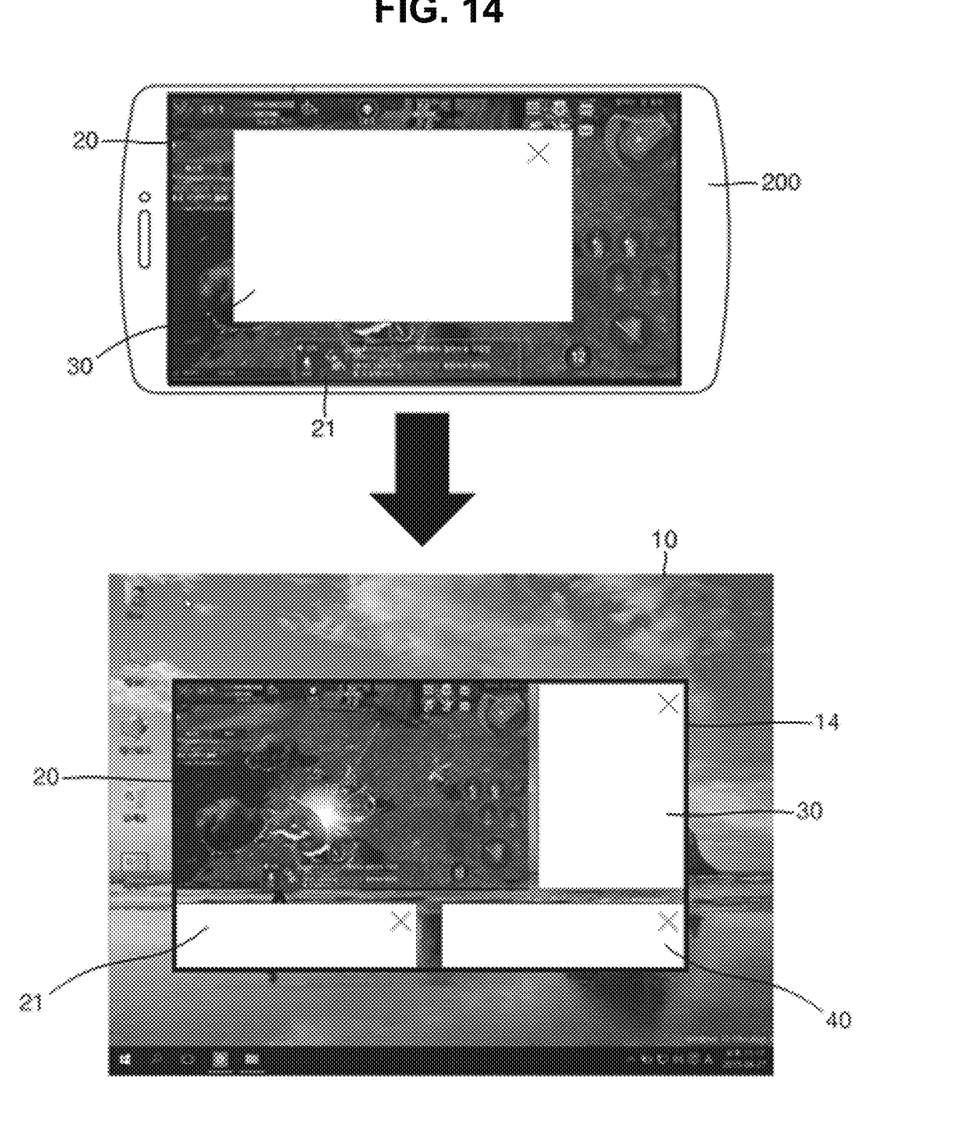
FIG. 14 is an example of executing a mobile game operating method according to an embodiment of the present disclosure.

FIG. 14 illustrates an example in which a mobile game operating method is executed according to an embodiment of the present disclosure.

For example, referring to FIG. 14, in the terminal 200, the first interface screen 20, a main screen, may be displayed on the entire screen of the terminal 200, and when an inventory is executed on the main screen, the second interface screen 30 as an inventory window may displayed on the first interface screen in an overlapping manner or in a switching manner. In this case, the user may have no choice but to selectively check and control the first interface screen 20 and the second interface screen 30.

However, in the mobile game operating apparatus 100, when the multi-display function is executed, the second interface screen 30 may be displayed next to the first interface screen 20, and a third interface screen 21 formed by enlarging a portion of the first interface screen 20 may be further displayed, and the emulator setting window may be further displayed.

In this manner, the mobile game operating apparatus 100 and the operating method may display and provide various interface screens of the mobile game at the same time so that the user may enjoy the mobile game in a better environment of the terminal 200.

Interworking Between Interface Screens

The processor 160 may cause the displayed interface screens to interwork with each other (S107).

Specifically, among the first to third interface screens 21, matters which are changed according to the progress of the mobile game may be reflected in real time and displayed on the first to third interface screens 21.

For example, if a new item is acquired while the mobile game is performed on the first interface screen 20, information regarding the new item may be displayed on the second interface screen 30 as an inventory and text indicating that the item has been acquired may be displayed on the third interface screen 21.

Also, when emulator setting is changed on the fourth interface screen 40, the changed setting may be reflected on the first interface screen 20 as well. For example, if resolution is increased in the emulator setting, it can be confirmed that resolution of the first interface screen 20 increases in real time.

Also, when the fifth interface screen 15 is displayed, if there is changed information while the mobile game is performed, the changed information may be associated with the fifth interface screen 15 and new information may be displayed on the fifth interface screen 15 in real time.

In detail, when a specific matter is changed while the mobile game is being performed, the processor 160 may transmit the specific changed matter to the game-related auxiliary service server 600 that provides the fifth interface screen 15, receives a feedback from the game-related auxiliary service server 600, and display the feedback on the fifth interface screen 15, whereby the mobile game and the fifth interface screen 15 may be cooperated.

For example, when a new item is acquired while the mobile game is being performed, the processor 160 may transmit item information to an item transaction site, receives a feedback of transaction information of the item, and display the transaction information on the fifth interface screen 15 to allow the item to be dealt, whereby the mobile game and the fifth interface screen 15 may be cooperated.

As described above, in the mobile game operating apparatus 100 and the operating method, since the interface screens interwork with each other in real time, the user may check information regarding the mobile game more than in the terminal 200 and operate more various mobile games, emulator setting convenience may be enhanced, and mobile game-related information may be checked in real time.

The mobile game operating method and apparatus according to the embodiment may allow a mobile game produced for a terminal to be compatible with a personal computer, and thus, a mobile game may be executed even in the personal computer.

Also, the mobile game operating method and apparatus according to the embodiment may efficiently utilize a large screen of the display unit through the multi-display function of simultaneously displaying a plurality of interface screens.

In detail, since a plurality of interface screens are displayed in different regions using a larger screen of the display unit of the personal computer than that of a terminal through the multi-display function according to an embodiment, the user may enjoy a mobile game more smoothly and easily by executing various mobile game-related functions, while viewing the plurality of interface screens on a single virtual terminal screen.

For example, through the multi-display function according to the embodiment, a main screen of a mobile game may be displayed in a region of the virtual terminal screen and a sub-screen of the mobile game may be displayed in another region so that the user may view the main screen and the sub-screen at the same time and perform various controls.

Also, through the multi-display function according to the embodiment, the user may display only a game progress status window in a region of the display unit, while performing another task, so that the user may smoothly perform the other task, while quickly check only the occurrence of an urgent situation.

In addition, through the multi-display function according to the embodiment, when the emulator setting has a problem, while playing the mobile game, the user may change the setting and simultaneously check a change in a mobile game screen (e.g., resolution, change in key operation, etc.).

That is, since the simultaneously displayed interface screens interwork each other in real time through the multi-display function according to the embodiment, the user may check more information regarding the mobile game than in the terminal and operate more various mobile games, emulator setting convenience may be enhanced, and mobile game-related information may be checked in real time.

The embodiment of the present disclosure described above may be implemented as computer commands which can be executed through various computer components and recorded in a non-transitory computer-readable recording medium. The non-transitory computer-readable recording medium may include program instructions, data files, data structures or a combination thereof. Program instructions recorded on the computer-readable recording medium may be particularly designed and structured for the present disclosure or available to those skilled in computer software. Examples of the non-transitory computer-readable recording medium include hardware devices particularly configured to store and perform program instructions, such as magnetic mediums, such as a hard disk, a floppy disk, and a magnetic tape; optical mediums, such as a compact disk-read only memory (CD-ROM) and a digital versatile disc (DVD); magneto-optical mediums, such as floptical disks, a read-only memory (ROM), a random access memory (RAM); and a flash memory. The program instructions may include, for example, a high-level language code that can be executed by a computer using an interpreter, as well as a machine language code made by a complier. The hardware device described herein may combined with one or more software modules to perform processing according to the present disclosure, and vice versa.

The specific executions described in the present disclosure are embodiments and do not limit the scope of the present disclosure by any method. For simplicity of the specification, electronic components, control systems, software, and other functional factors in the related art may be omitted. In addition, connection of lines or connection members between the components in the drawings illustrate functional connection and/or physical or circuital connection as example, and thus in a real apparatus, replaceable or additional diverse functional connection, physical connection or circuital connection may be provided. Also, they may not necessarily be essential components for application of the present disclosure unless specifically mentioned such as by "essential" or "importantly".

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the claimed invention, the drawings and the appended claims.

What is claimed is:

1. A mobile game operating method performed in a processor for executing a mobile game in a personal computer, the mobile game operating method comprising:
   executing an emulator for causing a mobile game to be compatible in a personal computer;
   creating, by the emulator, a virtual terminal;

executing the mobile game including a main screen and a sub-screen through the virtual terminal;

displaying the main screen of the mobile game in a basic mode;

executing a multi-display function to simultaneously display at least two interface screens of a plurality of interface screens including the main screen of the mobile game; and changing the basic mode to a multi-mode according to execution of the multi-display function, wherein the at least two interface screens are simultaneously displayed in a non-overlapping manner in the multi-mode.

2. The mobile game operating method of claim 1, wherein the at least two interface screens include a first interface screen as the main screen of the mobile game and a second interface screen as the sub-screen of the mobile game.

3. The mobile game operating method of claim 2, wherein the second interface screen is smaller than the first interface screen and displayed on the first interface screen in an overlapping manner in the basic mode.

4. The mobile game operating method of claim 3, wherein the displaying of the at least two interface screens in the multi-mode includes:

displaying the first interface screen and displaying the second interface screen adjacent to the first interface screen; and displaying information changed as the mobile game continues, on the first interface screen and the second interface screen in real time.

5. The mobile game operating method of claim 4, wherein the displaying of the at least two interface screens in the multi-mode includes:

when displaying of the first interface screen is terminated, displaying only the second interface screen.

6. The mobile game operating method of claim 1, wherein the plurality of interface screens include a first interface screen as the main screen for playing the mobile game and a third interface screen as a partial region of the first interface screen.

7. The mobile game operating method of claim 6, wherein the displaying of the at least two interface screens in the multi-mode includes:

specifying the partial region of the first interface screen; and displaying the specified partial region next to the first interface screen.

8. The mobile game operating method of claim 1, wherein the plurality of interface screens include a first interface screen as the main screen of the mobile game and a fourth interface screen as an emulator-related setting window.

9. The mobile game operating method of claim 8, wherein the displaying of the at least two interface screens in the multi-mode includes:

displaying the first interface screen and displaying the fourth interface screen adjacent to the first interface screen;

changing the emulator setting according to a user input through the fourth interface screen; and changing the first interface screen in real time according to the changed emulator setting.

10. The mobile game operating method of claim 1, wherein the plurality of interface screens include a first interface screen as the main screen of the mobile game and a fifth interface screen as an auxiliary service execution window related to the mobile game.

11. The mobile game operating method of claim 10, wherein the displaying of the at least two interface screens in the multi-mode includes:

displaying the first interface screen and displaying the fifth interface screen adjacent to the first interface screen; and combining the first interface screen and the fifth interface screen.

12. The mobile game operating method of claim 11, wherein the auxiliary service execution window is an execution window for providing a game-related auxiliary service provided by a game-related auxiliary service server, and the game-related auxiliary service includes a service for displaying mobile game-related information.

13. The mobile game operating method of claim 12, wherein the displaying of the at least two interface screens in the multi-mode further includes:

when information is changed while the mobile game is being performed through the first interface screen, displaying feedback information related to the changed information on the fifth interface screen.

14. The mobile game operating method of claim 13, wherein the displaying of feedback information related to the changed information on the fifth interface screen includes:

when new mobile game change information is acquired as the mobile game is performed, transmitting the mobile game change information to the game-related auxiliary service server;

receiving mobile game-related information related to the mobile game change information; and displaying the mobile game-related information through the auxiliary service execution window.

15. The mobile game operating method of claim 1, wherein the plurality of interface screens include a first interface screen as the main screen of the mobile game and further includes at least one of a second interface screen as the sub-screen of the mobile game, a third interface screen as a partial region of the first interface screen, a fourth interface screen as the emulator-related setting window, and a fifth interface screen as an auxiliary service execution window related to the mobile game.

16. The mobile game operating method of claim 15, further comprising:

selecting an interface screen to be displayed from among the plurality of interface screens.

17. The mobile game operating method of claim 16, further comprising:

providing an interface for changing a region for displaying the interface screen when the multi-display function is executed, wherein the providing of an interface for changing a region for displaying the interface screen includes:

dividing a screen of the virtual terminal into at least two regions;

adjusting a size or a position of the divided regions; and selecting an interface screen to be displayed in the divided regions.

18. The mobile game operating method of claim 17, wherein the displaying of the at least two interface screens in the multi-mode includes:

newly creating a second virtual terminal screen outside a first virtual terminal screen displaying the first interface screen and displaying the second interface screen on the second virtual terminal screen;

adjusting a size or a position of the first virtual terminal screen; and adjusting a size or a position of the second virtual terminal screen.

19. The mobile game operating method of claim 16, further comprising:

cooperatively operating the simultaneously displayed different interface screens.

20. A mobile game operating apparatus as a personal computer connected to a display device, the mobile game operating apparatus comprising:

a memory, including one or more non-transitory recording medium, storing an emulator program executing a mobile game in a compatible manner and a mobile game application; and a processor, including one or more integrated circuits, executing the emulator program in the memory and subsequently creating a virtual terminal through the emulator program, and executing the mobile game including a main screen and a sub-screen through the virtual terminal, wherein when the mobile game is executed, the processor controls the display device to display the main screen of the mobile game in a basic mode, and when a multi-display function is executed according to a user input, the processor controls the display device to simultaneously display at least two interface screens of a plurality of interface screens including the main screen of the mobile game in a non-overlapping manner in a multi-mode.

* * * * *